US012613561B2

(12) United States Patent
Zhan et al.

(10) Patent No.: US 12,613,561 B2
(45) Date of Patent: Apr. 28, 2026

(54) ROTATING SHAFT MECHANISM AND ELECTRONIC DEVICE

(71) Applicant: HUAWEI TECHNOLOGIES CO., LTD., Guangdong (CN)

(72) Inventors: Qiang Zhan, Shanghai (CN); Yake Zou, Dongguan (CN); Leilei Hua, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 208 days.

(21) Appl. No.: 18/626,422

(22) Filed: Apr. 4, 2024

(65) Prior Publication Data

US 2024/0248519 A1     Jul. 25, 2024

Related U.S. Application Data

(63) Continuation of application No. PCT/CN2022/127007, filed on Oct. 24, 2022.

(30) Foreign Application Priority Data

Oct. 29, 2021    (CN) .......................... 202111269091.5

(51) Int. Cl.
*G06F 1/16*            (2006.01)
(52) U.S. Cl.
CPC .......... *G06F 1/1681* (2013.01); *G06F 1/1616* (2013.01); *G06F 1/1652* (2013.01); *G06F 1/1686* (2013.01)
(58) Field of Classification Search
CPC combination set(s) only.
See application file for complete search history.

(56) References Cited

U.S. PATENT DOCUMENTS 11,467,633 B2 *  10/2022  Liao ...................... G06F 1/1641
11,706,886 B2 *  7/2023  Wu ...................... H05K 5/0217
                                                                         361/807
(Continued)

FOREIGN PATENT DOCUMENTS

CN          110719346 A      1/2020
CN          111901458 A      11/2020
(Continued)

OTHER PUBLICATIONS

Office Action in Japanese Appln. No. 2024-524465, mailed on May 23, 2025, 17 pages (with English translation).

(Continued)

*Primary Examiner* — Lisa Lea-Edmonds
(74) *Attorney, Agent, or Firm* — Fish & Richardson P.C.

(57)          ABSTRACT

A rotating shaft mechanism (1) includes a main shaft module (101), and the main shaft module (101) includes a base (1013), a first support plate (1011), a second support plate (1012), a first gear linkage (1014), a second gear linkage (1015), an elastic mechanical part (1022), and a conjoined cam (1021). The first support plate (1011) and the second support plate (1012) are rotatably connected to the base (1013). The first gear linkage (1014) and the second gear linkage (1015) are rotatably connected to an end portion of the base (1013), and the first gear linkage (1014) and the second gear linkage (1015) are connected through transmission by using gears that are engaged with each other.

20 Claims, 10 Drawing Sheets

(56) References Cited

U.S. PATENT DOCUMENTS

| | | | |
|---|---|---|---|
| 11,762,431 B2* | 9/2023 | Zhan | G06F 1/1681 |
| | | | 361/679.27 |
| 11,846,998 B2* | 12/2023 | Wu | H05K 5/0226 |
| 11,914,433 B2* | 2/2024 | Liao | H04M 1/0268 |
| 12,047,521 B2* | 7/2024 | Liao | G06F 1/1652 |
| 12,081,686 B2* | 9/2024 | Nagai | F16C 11/04 |
| 12,316,791 B2* | 5/2025 | Liao | G06F 1/1681 |
| 12,332,695 B2* | 6/2025 | Lin | G06F 1/181 |
| 12,332,703 B2* | 6/2025 | Liao | F16C 11/04 |
| 2020/0267859 A1* | 8/2020 | Kim | G06F 1/1641 |
| 2021/0181808 A1* | 6/2021 | Liao | H04M 1/0216 |
| 2022/0004232 A1* | 1/2022 | Wu | G06F 1/1652 |
| 2022/0011828 A1* | 1/2022 | Zhan | G06F 1/1652 |
| 2022/0104370 A1* | 3/2022 | Wu | G06F 1/1681 |
| 2022/0116489 A1* | 4/2022 | Nagai | G06F 1/1652 |
| 2022/0303371 A1* | 9/2022 | Liao | H04M 1/0268 |
| 2023/0054923 A1* | 2/2023 | Liao | G06F 1/1681 |
| 2023/0244274 A1* | 8/2023 | Lin | G06F 1/181 |
| | | | 361/679.27 |
| 2024/0069604 A1* | 2/2024 | Xu | G06F 1/1652 |
| 2024/0160253 A1* | 5/2024 | Liao | H04M 1/0268 |
| 2024/0219978 A1* | 7/2024 | Nagai | G06F 1/1652 |
| 2024/0248519 A1* | 7/2024 | Zhan | G09F 9/301 |
| 2024/0275873 A1* | 8/2024 | Zhou | H04M 1/0268 |
| 2024/0302864 A1* | 9/2024 | Wu | G06F 1/1681 |
| 2024/0340365 A1* | 10/2024 | Liao | G06F 1/1681 |

FOREIGN PATENT DOCUMENTS

| | | |
|---|---|---|
| CN | 113315860 A | 8/2021 |
| EP | 3842647 A1 | 6/2021 |
| JP | 2021131837 A | 9/2021 |
| JP | 2023506798 A | 2/2023 |
| KR | 20200094763 A | 8/2020 |
| KR | 20210089769 A | 7/2021 |
| WO | 2020010987 A1 | 1/2020 |
| WO | 2020222466 A1 | 11/2020 |
| WO | 2022111544 A1 | 6/2022 |

OTHER PUBLICATIONS

Office Action in Korean Appln. No. 2024-7011864, mailed on May 6, 2025, 11 pages (with English translation).

International Search Report and Written Opinion in International Appln. No. PCT/CN2022/127007, mailed on Jan. 18, 2023, 19 pages (with English translation).

Extended European Search Report in European Appln. No. 22885855.1, mailed on Nov. 18, 2024, 10 pages.

Office Action in Korean Appln. No. 10-2024-7011864, mailed on Jan. 1, 2026, 12 pages.

\* cited by examiner

101

ROTATING SHAFT MECHANISM AND ELECTRONIC DEVICE

CROSS-REFERENCE TO RELATED APPLICATION

This application is a continuation of International Application No. PCT/CN2022/127007, filed on Oct. 24, 2022, which claims priority to Chinese Patent Application No. 202111269091.5, filed on Oct. 29, 2021. The disclosures of the aforementioned applications are hereby incorporated by reference in their entireties.

TECHNICAL FIELD

This application relates to the field of electronic device technologies, and in particular, to a rotating shaft mechanism and an electronic device.

BACKGROUND

With the gradual maturity of flexible display technologies, there have been great changes in display forms of electronic devices. A mobile phone with a foldable flexible display, a tablet with a foldable flexible display, a wearable electronic device with a foldable flexible display, and the like are one of the important evolution directions of smart electronic devices in the future.

A flexible display is a key component in a foldable electronic device and features in continuous folding. Generally, in a process of folding the foldable electronic device, to prevent the flexible display from being pulled or squeezed, forces received at all parts of the flexible display in the process of folding the electronic device need to be relatively even.

Therefore, how to reduce a risk of damage to the flexible display by preventing the flexible display from being pulled or squeezed in a process of folding the foldable electronic device has become a challenge to be urgently addressed by a person skilled in the art.

SUMMARY

This application provides a rotating shaft mechanism and an electronic device, to reduce a risk of damage to a flexible display of the electronic device, prolong service life of the flexible display, and improve reliability of the electronic device.

According to a first aspect, this application provides a rotating shaft mechanism. The rotating shaft mechanism may include a main shaft module. The main shaft module may include a base, and the base may be used as a support structure of the entire main shaft module. In addition, the main shaft module may further include a first support plate, a second support plate, a first gear linkage, and a second gear linkage. The first support plate and the second support plate are located on two opposite sides of the base, and both the first support plate and the second support plate are rotatably connected to the base. The first gear linkage and the second gear linkage are rotatably connected to an end portion of the base, the first gear linkage and the first support plate are located on a same side of the base, and the second gear linkage and the second support plate are located on a same side of the base. One end that is of the first gear linkage and that faces the second gear linkage is provided with a first gear and a first cam structure that are coaxially disposed, and one end that is of the second gear linkage and that faces the first gear linkage is provided with a second gear that is coaxially disposed. The first gear and the second gear may be engaged to implement a transmission connection between the first gear and the second gear. In addition, the first support plate may be provided with a first track groove, and the first gear linkage may be provided with a first guiding part. The first guiding part may be inserted into the first track groove and may slide along the first track groove. Similarly, the second support plate may be provided with a second track groove, and the second gear linkage may be provided with a second guiding part. The second guiding part is inserted into the second track groove and may slide along the second track groove.

In this application, the main shaft module may further include a conjoined cam. The conjoined cam is provided with a second cam structure and a fourth cam structure. A third cam structure is disposed opposite to the first cam structure, and the fourth cam structure is disposed opposite to the second cam structure. In addition, the elastic mechanical part may be located on a side that is of the first cam structure and the second cam structure and that is away from the conjoined cam. An elastic force accumulated by the elastic mechanical part may press the first cam structure and the second cam structure against the conjoined cam, so that the first cam structure closely fits the third cam structure, and the second cam structure closely fits the fourth cam structure. In this way, in a process in which the first gear linkage and the second gear linkage rotate relative to the base, the first cam structure and the third cam structure, and the second cam structure and the fourth cam structure may fit with each other, to generate corresponding damping forces at different rotation positions. This provides a user with an obvious rotation feel, and improves user experience. In addition, the damping forces generated at different rotation positions may further enable the first gear linkage and the second gear linkage to suspend motion without an external force, so that the first support plate and the second support plate are suspended at corresponding rotation positions. When this is applied to an electronic device, a personalized use requirement of the user can be met.

According to the rotating shaft mechanism provided in this application, when the first support plate rotates relative to the base, the first guiding part may slide along the first track groove, to drive the first gear linkage to rotate around the base. In addition, the first gear linkage and the second gear linkage are connected through transmission by using the first gear and the second gear, so that the second gear linkage may rotate synchronously relative to the first gear linkage. In this case, the second guiding part may slide along the second track groove, to drive the second support plate to rotate relative to the base. In this way, the first support plate and the second support plate can rotate synchronously. When the rotating shaft mechanism is applied to the electronic device, the first support plate may be fastened to one housing of the electronic device, and the second support plate may be fastened to the other housing of the electronic device. In this case, the first support plate and the second support plate rotate synchronously, so that synchronous rotation of the two housings of the electronic device can be implemented. In this way, forces at each part of the flexible display fastened to the two housings can be relatively even and the flexible display can be avoided from being pulled or squeezed. Therefore, a risk of damage to the flexible display is reduced and structural reliability of the flexible display is improved.

In a possible implementation of this application, the main shaft module may further include a first gear shaft and a second gear shaft. The first gear shaft runs through the first gear, the first cam structure, and the third cam structure. The first gear linkage may be rotatably connected to the first gear shaft. Similarly, the second gear shaft runs through the second gear, the second cam structure, and the fourth cam structure. The second gear linkage may be rotatably connected to the second gear shaft. The first gear linkage and the second gear linkage may rotate around a corresponding gear shaft, so that rotation reliability of the first gear linkage and the second gear linkage can be improved. This improves motion stability of the entire main shaft module.

In addition, the main shaft module may further include a conjoined clasp. An end portion that is of the first gear shaft and that is away from the first gear linkage may be connected to the conjoined clasp in a threaded manner. An end portion that is of the second gear shaft and that is away from the second gear linkage may be connected to the conjoined clasp in a threaded manner. In this case, the elastic mechanical part may be located between the conjoined clasp and the first gear and the second gear, and the elastic mechanical part may also elastically abut against the conjoined clasp, the first gear, and the second gear, so that the elastic mechanical part is capable of pressing the first cam structure and the second cam structure against the conjoined cam.

It may be understood that tightness of fitting between the first cam structure and the third cam structure and between the second cam structure and the fourth cam structure has an important impact on damping forces generated between cam structures that fit with each other. The tightness of the fitting may be adjusted by using a pressing force of the elastic mechanical part for pressing the first cam structure and the second cam structure against the conjoined cam. In addition, the end portion that is of the second gear shaft and that is away from the second gear linkage may be connected to the conjoined clasp in a threaded manner, and the end portion that is of the second gear shaft and that is away from the second gear linkage may be connected to the conjoined clasp in a threaded manner. Therefore, tightening degrees between the first gear shaft and the conjoined clasp and between the second gear shaft and the conjoined clasp are adjusted, so that a deformation of the elastic mechanical part can be adjusted. In this way, the pressing force of the elastic mechanical part for pressing the first cam structure and the second cam structure against the conjoined cam is adjusted.

In this application, when the elastic mechanical part is specifically disposed, the elastic mechanical part may be but is not limited to a spring. There may be a plurality of elastic mechanical parts. At least one elastic mechanical part may be sleeved on the first gear shaft, and an elastic acting force generated by the at least one elastic mechanical part may be applied to the first gear. The at least one elastic mechanical part may be sleeved on the second gear shaft, and the elastic acting force generated by the at least one elastic mechanical part may be applied to the second gear.

Structures such as the conjoined clasp, the elastic mechanical part, the first gear shaft, and the second gear shaft may be mounted on the base. In a possible implementation of this application, the base may be further provided with an accommodation groove. Then, structures such as the conjoined clasp, the elastic mechanical part, the first gear shaft, and the second gear shaft may be accommodated in the accommodation groove. In addition, the conjoined clasp may abut against a groove wall of the accommodation groove, so that the conjoined clasp is reliably connected to the base.

To implement a rotational connection between the first support plate and the base and between the second support plate and the base, in a possible implementation of this application, the base is provided with a first sliding groove and a second sliding groove. A side surface that is of the first support plate and that faces the base is provided with a first sliding arm, and a side surface that is of the second support plate and that faces the base is provided with a second sliding arm. The first sliding arm may be accommodated in the first sliding groove, and the first sliding arm is slidable along the first sliding groove in a direction close to or away from the second support plate. The second sliding arm may be accommodated in the second sliding groove, and the second sliding arm is slidable along the second sliding groove in a direction close to or away from the second support plate. In this way, both the first support plate and the second support plate may implement a rotational connection by using a virtual shaft in which the sliding arm and the sliding groove fit with each other. This can make a structure of the main shaft module relatively compact and facilitate implementation of a miniaturization design of the main shaft module, so that the main shaft module occupies relatively small space in the rotating shaft mechanism, and more functional modules are disposed in the rotating shaft mechanism.

In addition, when the first sliding groove and the second sliding groove are specifically disposed, the first sliding groove and the second sliding groove may be disposed in a staggered manner in a direction of the first support plate and the second support plate, so that the structure of the main shaft module is more compact. In some other possible implementations of this application, the first sliding groove and the second sliding groove may alternatively be disposed opposite to each other.

In a possible implementation of this application, the main shaft module may further include a driven gear, there are an even quantity of driven gears, and the even quantity of driven gears are located between the first gear and the second gear, so that the first gear and the second gear are connected through transmission by using the even quantity of driven gears. This improves transmission stability of the first gear and the second gear and improves motion stability of the main shaft module.

The main shaft module may further include an intermediate gear shaft. The driven gears may be sleeved on the intermediate gear shaft, and the driven gears may be rotatably connected to the intermediate gear shaft, so that rotation reliability of the driven gears is improved.

In this application, the base may be further provided with a gearbox, and each driven gear may be mounted in the gearbox. The gearbox may store a lubricant added for the driven gears, to reduce abrasion of contact faces of the driven gears connected through transmission.

In addition, the base may be further provided with a first mounting hole and a second mounting hole, and opening directions of the first mounting hole and the second mounting hole may be the same as an extension direction of the rotating shaft mechanism. The first gear of the first gear linkage may be mounted in the first mounting hole, and the second gear of the second gear linkage may be mounted in the second mounting hole. The first gear and the second gear may be connected through transmission by using the driven gears. In this application, the first mounting hole and the second mounting hole may be in communication with the gearbox. In this way, the lubricant stored in the gearbox may be used for lubrication of the first gear and the second gear, to help reduce abrasion of contact faces between the driven gears and the first gear and between the driven gears and the second gear. This improves structural reliability of each gear.

In this application, the rotating shaft mechanism may include a plurality of the foregoing main shaft modules, and the plurality of main shaft modules may be specifically disposed based on an extension length of the rotating shaft mechanism. In addition, when the rotating shaft mechanism includes a plurality of main shaft modules, the plurality of main shaft modules may be disposed at intervals. To reduce gaps between the main shaft modules, the rotating shaft mechanism may further include a cover plate, and the cover plate may be located between two adjacent main shaft modules. The cover plate may include a first sub-cover plate and a second sub-cover plate, and the first sub-cover plate and the second sub-cover plate are rotatably connected to the base. The first sub-cover plate and the first support plate may be located on a same side of the base, and the first sub-cover plate is fastened to the first support plate. The second sub-cover plate and the second support plate may be located on a same side of the base, and the second sub-cover plate is fastened to the second support plate. In this way, the first sub-cover plate and the first support plate are connected to form a flat and continuous support face, and the second sub-cover plate and the second support plate are connected to form a flat and continuous support face. Therefore, when the rotating shaft mechanism is applied to the electronic device, a flexible display of the electronic device can be stably supported.

According to a second aspect, this application further provides an electronic device. The electronic device includes a first housing, a second housing, a flexible display, and the rotating shaft mechanism in the first aspect. The first housing and the second housing are respectively disposed on two opposite sides of the rotating shaft mechanism, the first support plate is fastened to the first housing, and the second support plate is fastened to the second housing. The flexible display continuously covers the first housing, the second housing, and the rotating shaft mechanism, and the flexible display is fastened to the first housing and the second housing.

In the electronic device in this application, the first support plate and the second support plate of the rotating shaft mechanism may rotate synchronously, so that synchronous rotation of two housings of the electronic device can be implemented. In this way, forces at each part of the flexible display fastened to the two housings can be relatively even and the flexible display can be avoided from being pulled or squeezed. Therefore, a risk of damage to the flexible display is reduced and structural reliability of the flexible display is improved.

In a possible implementation of this application, an end portion that is of the first housing and that faces the second housing is provided with a first opening groove, and an end portion that is of the second housing and that faces the first housing is provided with a second opening groove. In this way, when the first support plate is fastened to the first housing, the first support plate may be located in the first opening groove, and the first support plate is fastened to a groove wall of the first opening groove. The second support plate may be located in the second opening groove, and the second support plate is fastened to a groove wall of the second opening groove.

In addition, when the electronic device is in an unfolded state, the first opening groove and the second opening groove may press against each other to form an accommodation portion, and the rotating shaft mechanism may be hidden in the accommodation portion. In this way, the electronic device may have appearance effect of an integrated design, to improve appearance aesthetics of the electronic device.

REFERENCE NUMERALS

1—rotating shaft mechanism; 101—main shaft module; 1011—first support plate; 10111—first sliding arm; 10112—first avoidance opening;

10113—first track groove; 1012—second support plate; 10121—second sliding arm; 10122—second avoidance opening;

10123—second track groove; 1013—base; 10131—first sliding groove; 10132—second sliding groove; 10133—first mounting hole;

10134—second mounting hole; 10135—gearbox; 10136—mounting groove;

1014—first gear linkage; 10141—first gear; 10142—first guiding part; 10143—first cam structure;

1015—second gear linkage; 10151—second gear; 10152—second guiding part; 10153—second cam structure;

1016—first gear shaft; 1017—second gear shaft; 1018—driven gear; 1019—intermediate gear shaft;

1020—conjoined clasp; 1021—conjoined cam; 10211—
third cam structure; 10212—fourth cam structure;
1022—elastic mechanical part; 1023—first sub-cover
plate; 1024—second sub-cover plate; 1025—decora-
tive cover; 10251—accommodation groove;
2—first housing; 2a—first face; 2b—second face; 201—
first opening groove;
3—second housing; 3a—first face; 3b—second face;
301—second opening groove.

DESCRIPTION OF EMBODIMENTS

To make the objectives, technical solutions, and advan-
tages of this application clearer, the following further
describes this application in detail with reference to the
accompanying drawings.

Figure 1:
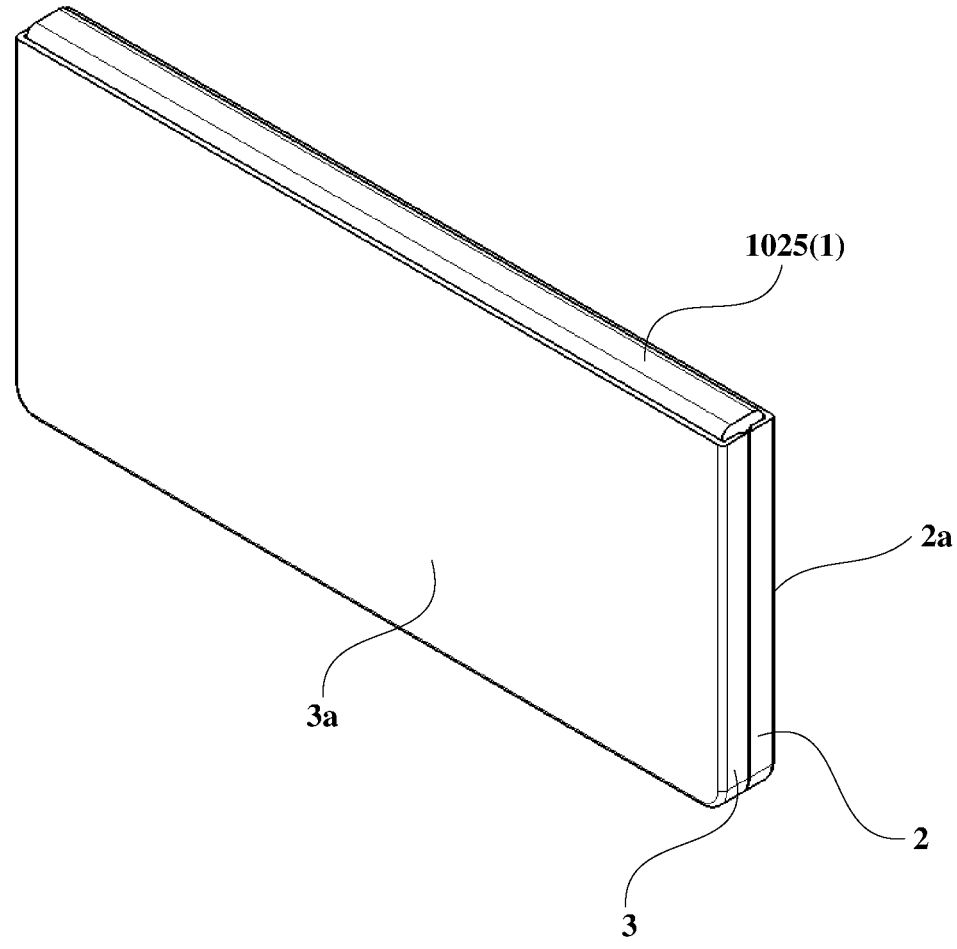
FIG. 1 is a schematic diagram of a structure of an electronic device according to an embodiment of this application.

For ease of understanding of a rotating shaft mechanism
provided in embodiments of this application, the following
first describes an application scenario of the rotating shaft
mechanism. The rotating shaft mechanism may be applied
to, but is not limited to, a foldable electronic device such as
a mobile phone, a palmtop (personal digital assistant, PDA),
a notebook computer, or a tablet. When the rotating shaft
mechanism provided in embodiments of this application is
applied to an electronic device, refer to FIG. 1. FIG. 1 is a
schematic diagram of a structure of an electronic device
according to an embodiment of this application. In addition
to a rotating shaft mechanism 1, the electronic device may
further include a first housing 2, a second housing 3, and a
flexible display (not shown in FIG. 1). The first housing 2
and the second housing 3 are located on two sides of the
rotating shaft mechanism 1, and are rotatable around the
rotating shaft mechanism 1. When the electronic device is in
use, the electronic device may be closed or unfolded based
on different use scenarios. In the embodiment shown in FIG.
1, the electronic device is in a closed state. In addition, FIG.
1 shows a relative position relationship between the rotating
shaft mechanism 1 and the two housings when the electronic
device is in the closed state. In this case, a surface of the
rotating shaft mechanism 1, a first face 2a of the first housing
2, and a first face 3a of the second housing 3 may be jointly
used as an outer face of the electronic device. The first face
2a of the first housing 2 is a surface that is of the first
housing 2 and that is away from the flexible display, and the
first face 3a of the second housing 3 is a surface that is of
the second housing 3 and that is away from the flexible
display.

Figure 2:
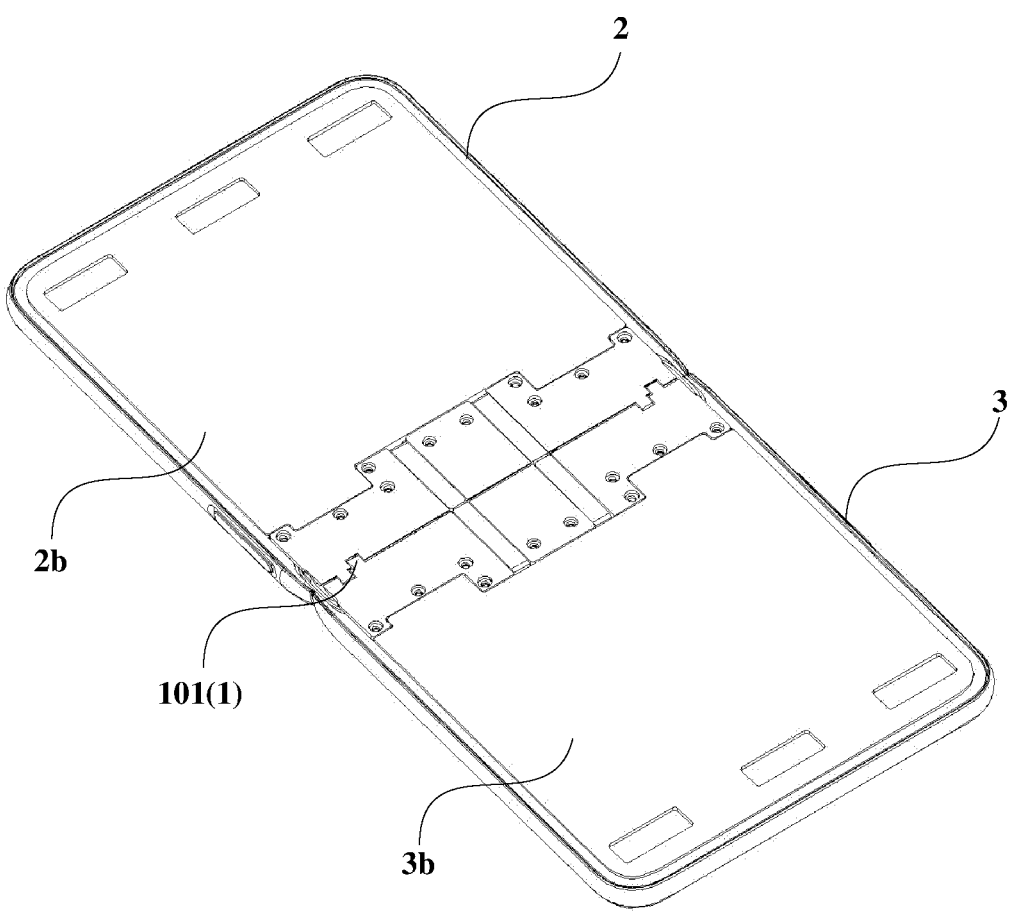
FIG. 2 is a schematic diagram of a structure of an electronic device according to another embodiment of this application.

In addition, FIG. 2 is a schematic diagram of a structure
of the electronic device in an unfolded state. It should be
noted that FIG. 2 shows a structure of a second face 2b of
the first housing 2 and a structure of a second face 3b of the
second housing 3. The second face 2b of the first housing 2
is a surface that is of the first housing 2 and that is used to
support the flexible display, and the second face 3b of the
second housing 3 is a surface that is of the second housing
3 and that is used to support the flexible display. The flexible
display may continuously cover the second face 2b of the
first housing 2, the second face 3b of the second housing 3,
and the rotating shaft mechanism 1. In addition, the flexible
display may be fastened to the second face 2b of the first
housing 2 and the second face 3b of the second housing 3,
and a connection manner may be but is not limited to
adhesion. In this way, when the electronic device is in the
unfolded state shown in FIG. 2, the first housing 2 and the
second housing 3 may support the flexible display.

Figure 3:
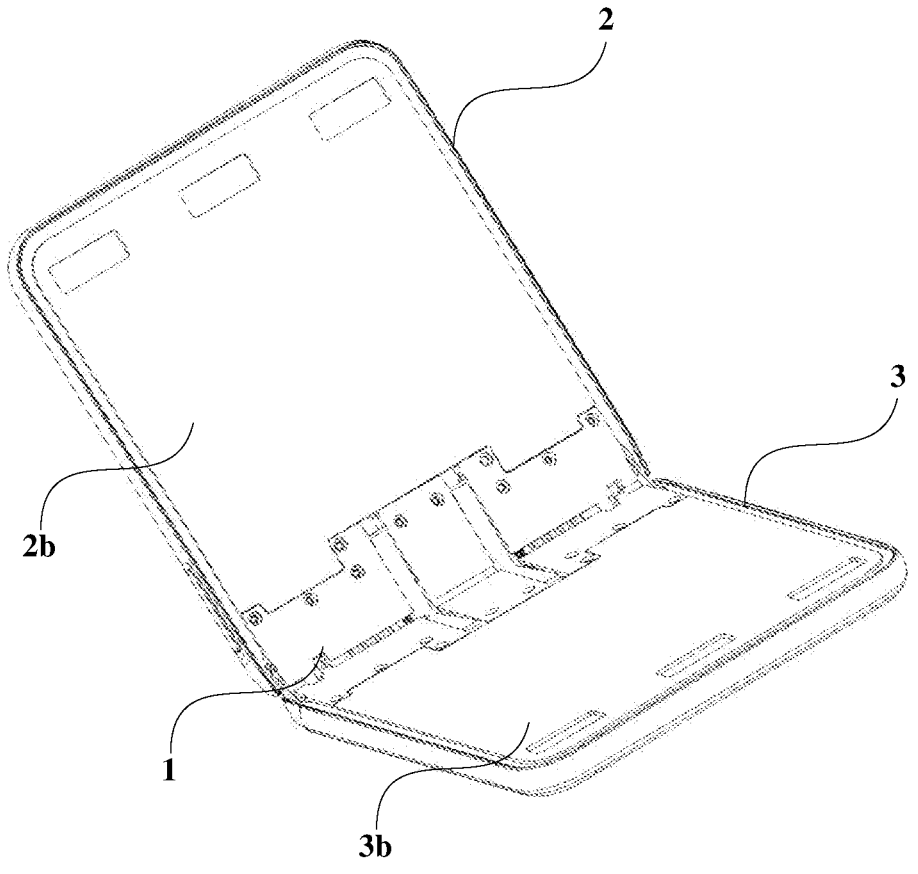
FIG. 3 is a schematic diagram of a structure of an electronic device according to another embodiment of this application.

FIG. 3 is a schematic diagram of a structure of the
electronic device in an intermediate state from an unfolded state to a closed state or from a closed state to an unfolded
state. In the state shown in FIG. 3, an included angle
between the second face 2b of the first housing 2 and the
second face 3b of the second housing 3 is greater than 0° and
less than 180°, for example, may be 150°. In a process in
which the first housing 2 and the second housing 3 relatively
rotate from the unfolded state shown in FIG. 2 to the closed
state shown in FIG. 1 or from the closed state shown in FIG.
1 to the unfolded state shown in FIG. 2, the flexible display
may be folded along with the first housing 2 and the second
housing 3.

It may be understood that the process in which the
electronic device switches from the unfolded state shown in
FIG. 2 to the closed state shown in FIG. 1 or from the closed
state shown in FIG. 1 to the unfolded state shown in FIG. 2
is a process in which the first housing 2 and the second
housing 3 rotate around the rotating shaft mechanism 1. As
a key functional component in the foldable electronic
device, the rotating shaft mechanism 1 may be disposed
corresponding to a foldable part of the flexible display.
Therefore, the rotating shaft mechanism 1 plays an impor-
tant role in supporting the foldable part of the flexible
display in the unfolded state shown in FIG. 2 and in
accommodating the foldable part of the flexible display in
the closed state shown in FIG. 1. In addition, a reliable
structure of the rotating shaft mechanism 1 may play an
important role in implementing stability of a movement
process of the electronic device. To facilitate understanding
of the rotating shaft mechanism 1 provided in embodiments
of this application, the following describes a structure of the
rotating shaft mechanism 1 in detail with reference to the
accompanying drawings.

Terms used in the following embodiments are only
intended to describe specific embodiments, but are not
intended to limit this application. The terms "one", "a",
"the", "the foregoing", "this", and "the one" of singular
forms used in this specification and the appended claims of
this application are also intended to include expressions such
as "one or more", unless otherwise specified in the context
clearly.

Reference to "an embodiment", "some embodiments", or
the like described in this specification indicates that one or
more embodiments of this application include a specific
feature, structure, or characteristic described with reference
to the embodiment. Therefore, statements such as "in an
embodiment", "in some embodiments", "in some other
embodiments", and "in other embodiments" that appear at
different places in this specification do not necessarily refer
to a same embodiment. Instead, the statements mean "one or
more but not all of embodiments", unless otherwise specifi-
cally emphasized in another manner. The terms "include",
"comprise", and "have", and variants thereof all mean
"include but are not limited to", unless otherwise specifi-
cally emphasized in another manner.

Figure 4:
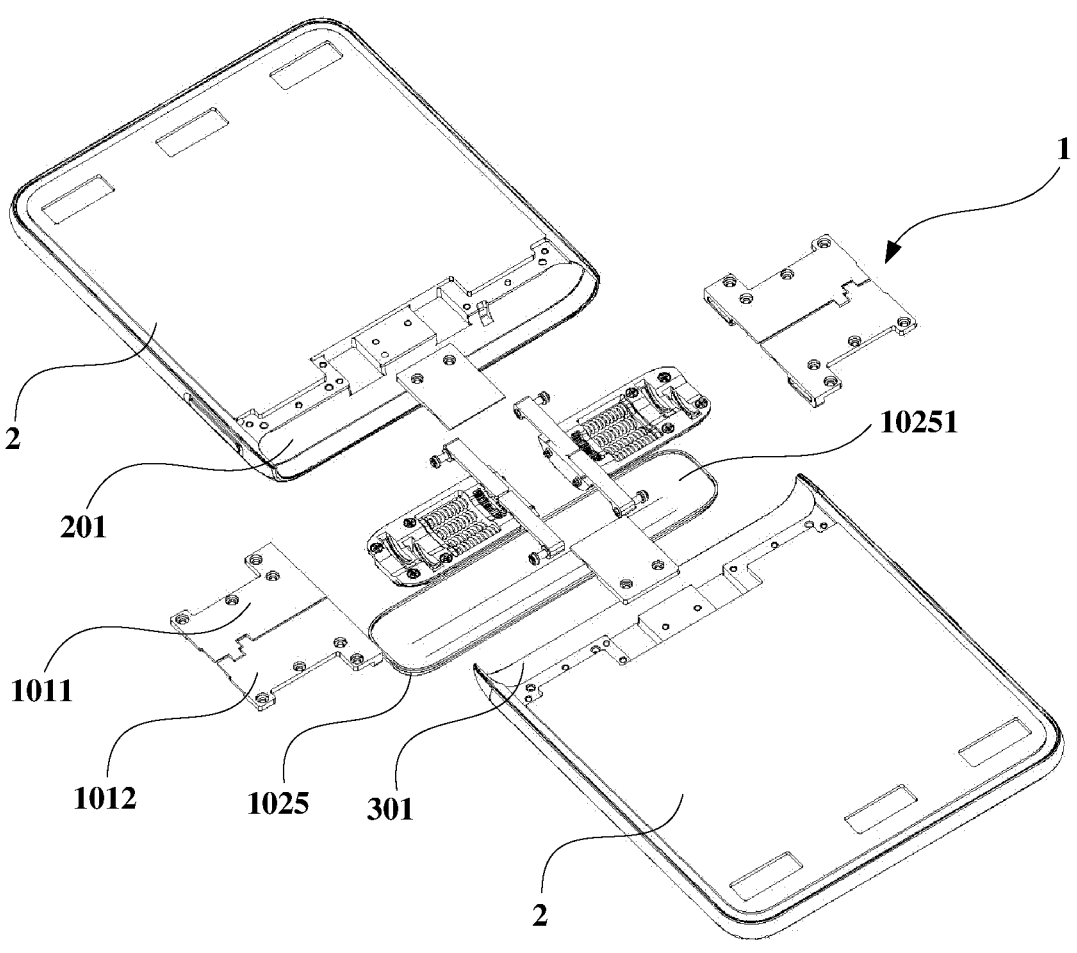
FIG. 4 is a schematic diagram of an exploded structure of an electronic device according to an embodiment of this application.

FIG. 4 is a schematic diagram of an exploded structure of
the electronic device shown in FIG. 2. As shown in FIG. 4,
the first housing 2 and the second housing 3 are located on
two opposite sides of the rotating shaft mechanism 1. With
reference to FIG. 2 and FIG. 4 together, the rotating shaft
mechanism 1 provided in embodiments of this application
may include a main shaft module 101. There may be one or
more main shaft modules 101, and the main shaft modules
101 may be specifically disposed based on a length of the
rotating shaft mechanism 1 in an extension direction of the
rotating shaft mechanism 1. In this application, the extension
direction of the rotating shaft mechanism 1 is the same as an
axial direction of a rotating shaft through which the first housing 2 and the second housing 3 rotate around the rotating shaft mechanism 1. In the embodiments shown in FIG. 2 and FIG. 4, the rotating shaft mechanism 1 includes two main shaft modules 101, and the two main shaft modules 101 may be symmetrically disposed along the extension direction of the rotating shaft mechanism 1.

Figure 5:
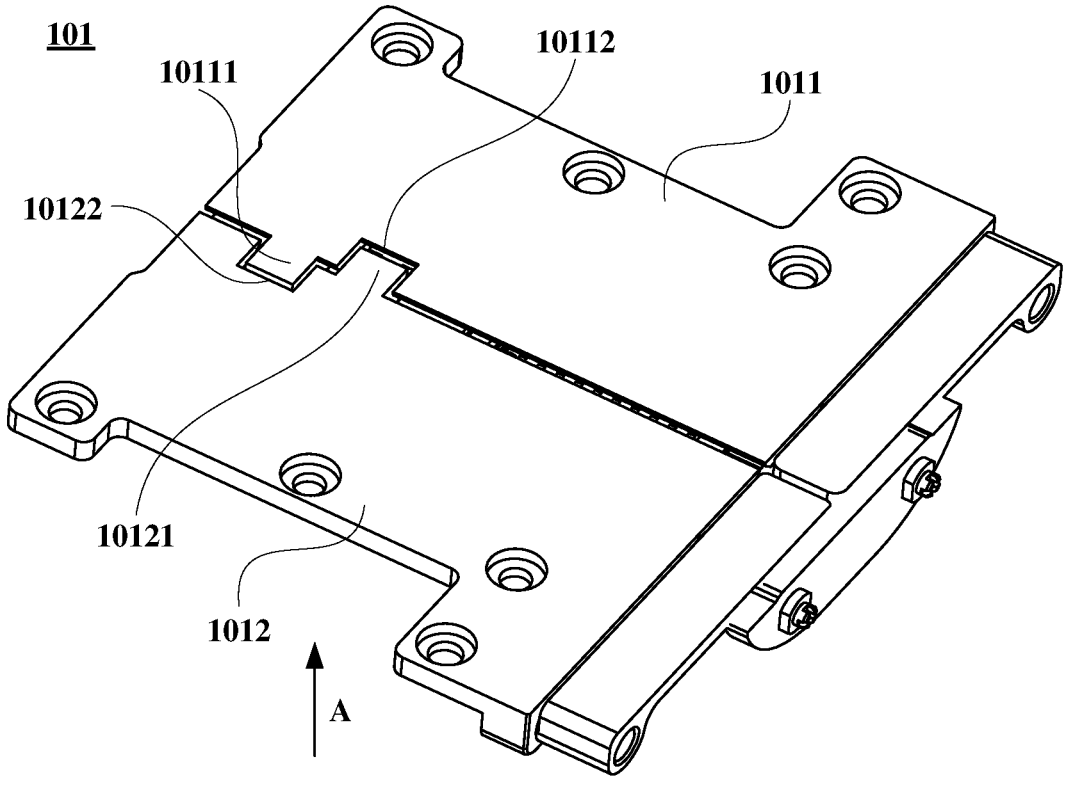
FIG. 5 is a schematic diagram of a structure of a main shaft module according to an embodiment of this application.

For each main shaft module 101, during specific arrangement, refer to FIG. 5. FIG. 5 is a schematic diagram of a structure of the main shaft module 101 according to an embodiment of this application. In this embodiment, the main shaft module 101 may include a first support plate 1011 and a second support plate 1012. The first support plate 1011 may be fastened to the first housing 2 of the electronic device shown in FIG. 4, and the second support plate 1012 may be fastened to the second housing 3. In a process in which the first housing 2 and the second housing 3 rotate relative to the rotating shaft mechanism 1, the support plates on the corresponding sides may be driven to rotate.

With reference to FIG. 4 and FIG. 5, in embodiments of this application, an end portion that is of the first housing 2 and that faces the second housing 3 may be provided with a first opening groove 201, and an end portion that is of the second housing 3 and that faces the first housing 2 may be provided with a second opening groove 301. In this case, the first support plate 1011 may be located in the first opening groove 201, and is fastened to a groove wall of the first opening groove 201. The second support plate 1012 may be located in the second opening groove 301, and is fastened to a groove wall of the second opening groove 301.

In addition, with reference to FIG. 2 and FIG. 4 together, when the electronic device is in an unfolded state, the first opening groove 201 and the second opening groove 301 press against each other to form an accommodation portion between the first housing 2 and the second housing 3. It can be seen from FIG. 2 that, when the electronic device is in the unfolded state, the entire rotating shaft mechanism 1 may be hidden in the accommodation portion.

In this application, the first support plate 1011 and the second support plate 1012 may support the flexible display. FIG. 5 shows a structure of the main shaft module 101 when the electronic device is in the unfolded state. In this case, the first support plate 1011 and the second support plate 1012 press against each other, and a gap between the two support plates is relatively small, to form a flat and continuous support face through connection, so that the flexible display can be stably supported, and the flexible display can be prevented from collapsing at the rotating shaft mechanism 1, to reduce deformation of the flexible display and improve structural reliability of the flexible display.

Figure 6:
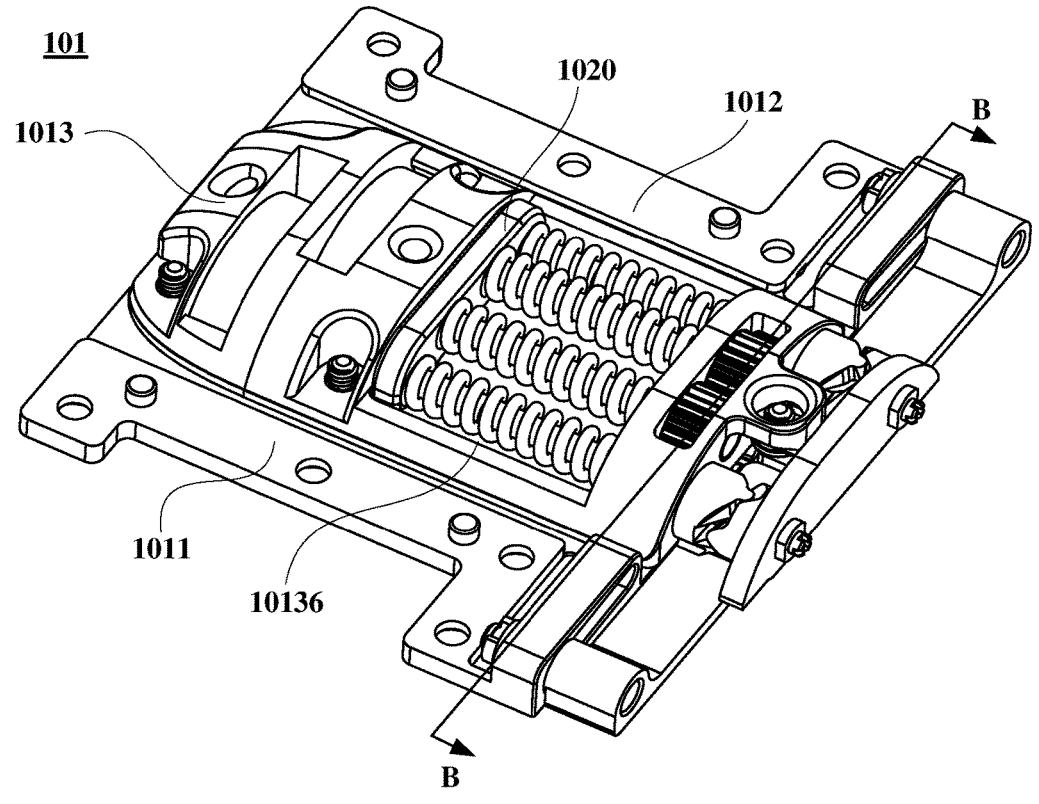
FIG. 6 is an A-direction view of the main shaft module shown in FIG. 5.
Figure 7:
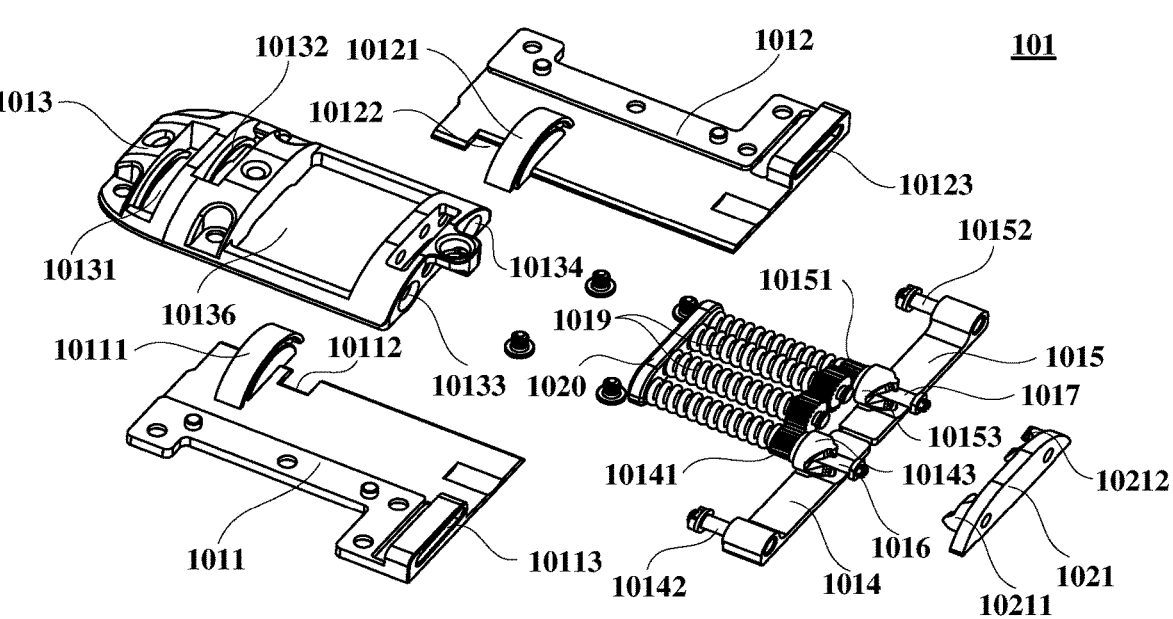
FIG. 7 is a schematic diagram of an exploded structure of the main shaft module shown in FIG. 6.

FIG. 6 is an A-direction view of the main shaft module 101 shown in FIG. 5. In this application, the main shaft module 101 may further include a base 1013, and the base 1013 may be used as a support structure of the entire main shaft module 101. The first support plate 1011 and the second support plate 1012 may be located on two sides of the base 1013, and are rotatably connected to the base 1013 separately. During specific implementation, refer to FIG. 7. FIG. 7 is a schematic diagram of an exploded structure of the main shaft module 101 shown in FIG. 6. The base 1013 may be provided with a first sliding groove 10131 and a second sliding groove 10132. The first sliding groove 10131 and the second sliding groove 10132 may be arc grooves. In addition, in a direction from the first support plate 1011 to the second support plate 1012, the first sliding groove 10131 and the second sliding groove 10132 may be disposed opposite to each other. Alternatively, the first sliding groove 10131 and the second sliding groove 10132 are disposed in a staggered manner. In this way, a size of the base 1013 in the direction from the first support plate 1011 to the second support plate 1012 can be effectively reduced, to facilitate a miniaturization design of the rotating shaft mechanism 1.

Still with reference to FIG. 7, in this application, a side surface that is of the first support plate 1011 and that faces the base 1013 may be provided with a first sliding arm 10111, and a side surface that is of the second support plate 1012 and that faces the base 1013 may be provided with a second sliding arm 10121. The first sliding arm 10111 may be accommodated in the first sliding groove 10131, and the first sliding arm 10111 is slidable along the first sliding groove 10131 in a direction close to or away from the second support plate 1012. The second sliding arm 10121 may be accommodated in the second sliding groove 10132, and the second sliding arm 10121 is slidable along the first sliding groove 10131 in a direction close to or away from the first support plate 1011. In this application, the first support plate 1011 and the second support plate 1012 are rotatably connected to the base 1013 separately by using a virtual shaft in which the sliding arm and the sliding groove fit with each other, so that structural compactness of the rotating shaft mechanism 1 can be effectively improved.

In addition, with reference to both FIG. 5 and FIG. 7, in this application, a first avoidance opening 10112 is provided on the first support plate 1011, and a second avoidance opening 10122 is provided on the second support plate 1012. In this way, the first avoidance opening 10112 may provide avoidance space for sliding of the second sliding arm 10121, and the second avoidance opening 10122 may provide avoidance space for sliding of the first sliding arm 10111, so that mutual interference between motions of the first support plate 1011 and the second support plate 1012 can be avoided. In addition, still with reference to FIG. 5, when the rotating shaft mechanism 1 is in an unfolded state, the first sliding arm 10111 is accommodated at the second avoidance opening 10122, and the second sliding arm 10121 is accommodated at the first avoidance opening 10112, so that the first support plate 1011 and the second support plate 1012 may form a continuous and flat support face used to support the flexible display.

Still with reference to FIG. 7, in this application, the main shaft module 101 may further include a first gear linkage 1014 and a second gear linkage 1015. An end that is of the first gear linkage 1014 and that faces the second gear linkage 1015 is provided with a first gear 10141, and an end that is of the second gear linkage 1015 and that faces the first gear linkage 1014 is provided with a second gear 10151. The first gear 10141 and the second gear 10151 may be connected through transmission.

Figure 8:
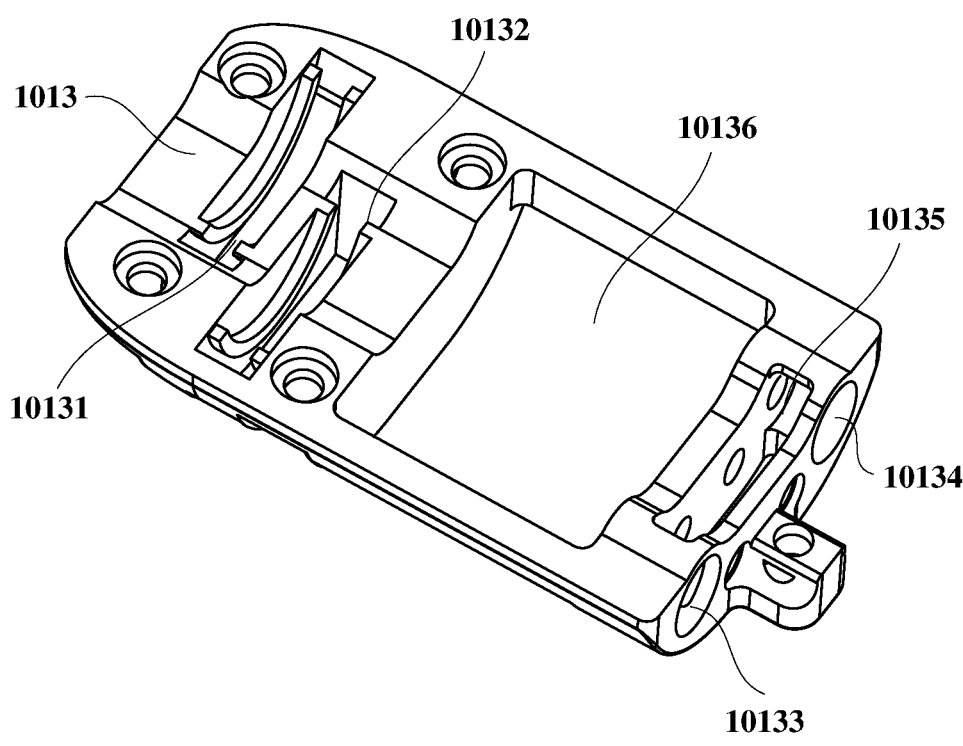
FIG. 8 is a schematic diagram of a structure of a base according to an embodiment of this application.

In addition, FIG. 8 is a schematic diagram of a structure of a base 1013 according to this application. An end portion of the base 1013 is provided with a first mounting hole 10133 and a second mounting hole 10134, and opening directions of the first mounting hole 10133 and the second mounting hole 10134 may be the same as an extension direction of the rotating shaft mechanism 1. In the embodiment shown in FIG. 8, both the first mounting hole 10133 and the second mounting hole 10134 are provided in a direction away from the first sliding groove 10131 and the second sliding groove 10132. With reference to FIG. 7 and FIG. 8 together, in this application, the first gear 10141 may be mounted in the first mounting hole 10133, and the second gear 10151 may be mounted in the second mounting hole 10134. In addition, the first gear 10141 may rotate in the first mounting hole 10133, and the second gear 10151 may rotate in the second mounting hole 10134, so that the first gear linkage 1014 and the second gear linkage 1015 are rotatably connected to the base 1013.

With reference to FIG. 6 and FIG. 7, the first support plate 1011 is further provided with a first track groove 10113, and the second support plate 1012 is further provided with a second track groove 10123. An opening direction of the first track groove 10113 is the same as an opening direction of the first mounting hole 10133, and an opening direction of the second track groove 10123 is the same as an opening direction of the second mounting hole 10134. An end portion that is of the first gear linkage 1014 and that is away from the second gear linkage 1015 is provided with a first guiding part 10142. The first guiding part 10142 is inserted into the first track groove 10113, and is slidable along the first track groove 10113. An end portion that is of the second gear linkage 1015 and that is away from the first gear linkage 1014 is provided with a second guiding part 10152. The second guiding part 10152 is inserted into the second track groove 10123, and is slidable along the second track groove 10123.

It may be understood that, in this application, specific shapes of the first track groove 10113 and the second track groove 10123 are not limited. For example, the first track groove 10113 and the second track groove 10123 may be strip grooves, provided that during movement of the first support plate 1011 and the second support plate 1012, the first support plate 1011 drives the first guiding part 10142 to slide along a specified track along the first track groove 10113, and the second support plate 1012 drives the second guiding part 10152 to slide along a specified track along the second track groove 10123. In addition, specific structural forms of the first guiding part 10142 and the second guiding part 10152 are not limited in this application. For example, the first guiding part 10142 and the second guiding part 10152 may be a pin shaft, one end of the pin shaft is fastened to the gear linkage, and the other end runs through a corresponding track groove. To avoid the pin shaft falling off from the corresponding track groove, refer to FIG. 6 and FIG. 7 together. A fastener such as a nut may be disposed at an end portion of the pin shaft that runs through the track groove and that is away from the gear linkage.

Figure 9A:
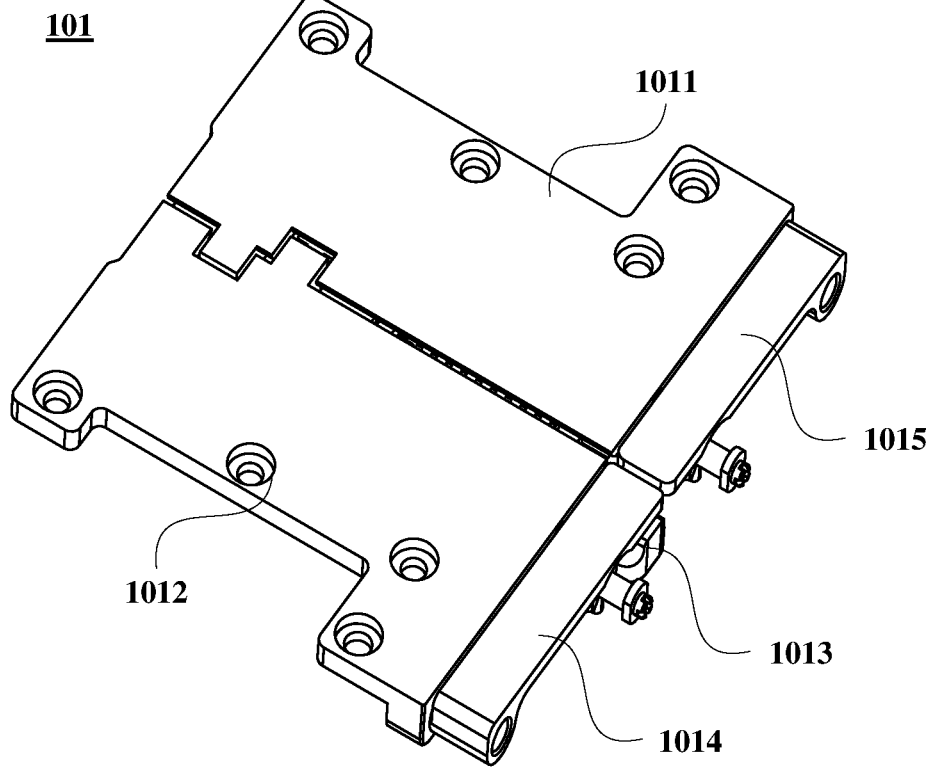
FIG. 9*a* is a schematic diagram of a structure of a main shaft module according to another embodiment of this application.
Figure 9B:
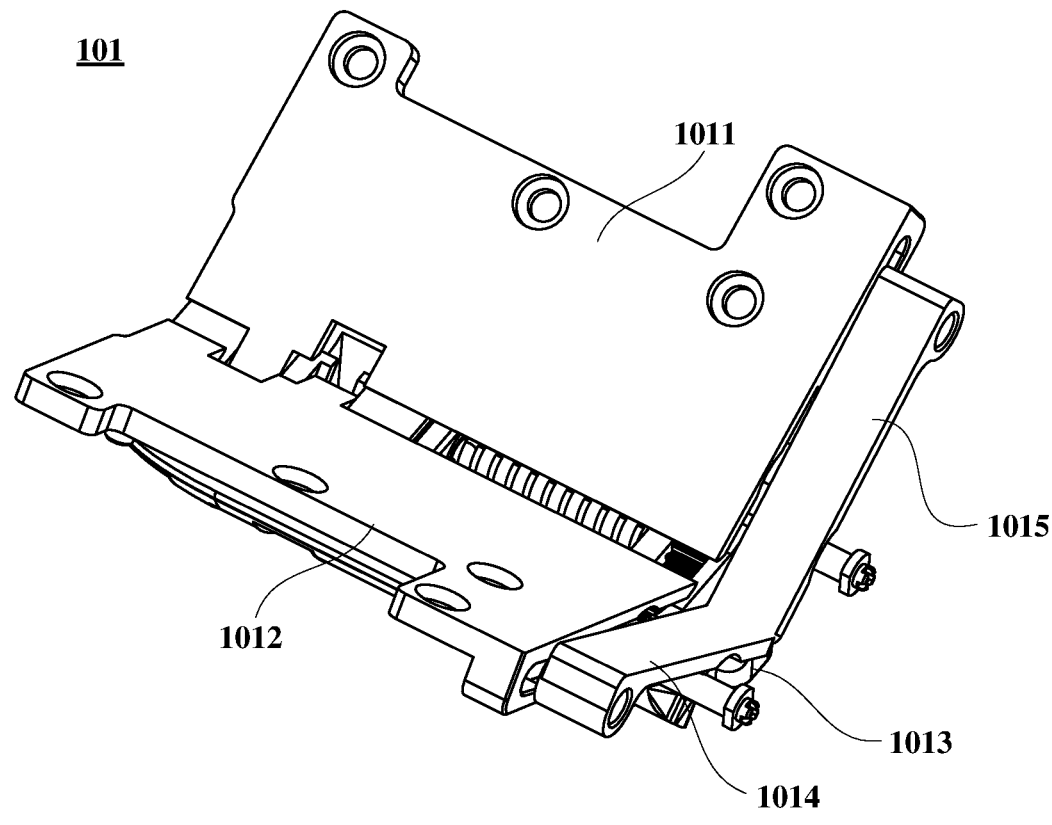
FIG. 9*b* is a schematic diagram of a structure of a main shaft module according to another embodiment of this application.

It can be learned from the description of the foregoing embodiment that, the first gear linkage 1014 is connected to the second gear linkage 1015 through transmission by using the first gear 10141 and the second gear 10151. The first gear linkage 1014 is slidably connected to the first support plate 1011 by using the first guiding part 10142 and the first track groove 10113, and the second gear linkage 1015 is slidably connected to the second support plate 1012 by using the second guiding part 10152 and the second track groove 10123. With reference to FIG. 9a and FIG. 9b together, FIG. 9a shows a relative position relationship between the first support plate 1011, the second support plate 1012, the first gear linkage 1014, and the second gear linkage 1015 in an unfolded state. FIG. 9b shows a relative position relationship between the first support plate 1011, the second support plate 1012, the first gear linkage 1014, and the second gear linkage 1015 in an intermediate state. In a process from the unfolded state shown in FIG. 9a to the intermediate state shown in FIG. 9b, the first support plate 1011 rotates relative to the base 1013 in a direction away from the second support plate 1012, to drive the first gear linkage 1014 to rotate relative to the base 1013 in a same direction. In this way, the second gear linkage 1015 rotates relative to the base 1013 in a direction opposite to the first gear linkage 1014. The second gear linkage 1015 may drive the second support plate

1012 to rotate relative to the base 1013 in a direction away from the first support plate 1011, so that the first support plate 1011 and the second support plate 1012 rotate synchronously, and a rotation direction of the second support plate 1012 is opposite to a rotation direction of the first support plate 1011. It can be learned from FIG. 9a and FIG. 9b that, in a process of changing from the unfolded state to the closed state, a display accommodation space may be formed between the first support plate 1011, the second support plate 1012, and the base 1013. The display accommodation space may be used to accommodate a foldable part of the flexible display, so that squeezing on the flexible display can be reduced and a risk of damage to the flexible display can be reduced.

It should be noted that, the first support plate 1011 may be fastened to the first housing 2 of the electronic device, and the second support plate 1012 may be fastened to the second housing 3 of the electronic device, so that synchronous rotation of the first housing 2 and the second housing 3 can be implemented by using the foregoing solution provided in this application. It may be understood that the synchronous rotation of the first housing 2 and the second housing 3 may drive synchronous motion of parts that are of the flexible display and that are fastened to the first housing 2 and the second housing 3, and can effectively improve uniformity of force applied to each part of the flexible display. In this way, the flexible display can be avoided from being pulled or squeezed, so that structural reliability of the flexible display is improved.

Still with reference to FIG. 7, the main shaft module 101 may further include a first gear shaft 1016 and a second gear shaft 1017. The first gear 10141 is sleeved on the first gear shaft 1016, and the first gear 10141 may be rotatably connected to the first gear shaft 1016. The second gear 10151 is sleeved on the second gear shaft 1017, and the second gear 10151 may be rotatably connected to the second gear shaft 1017. In this way, motion stability of the first gear linkage 1014 and the second gear linkage 1015 can be effectively improved.

Figure 10:
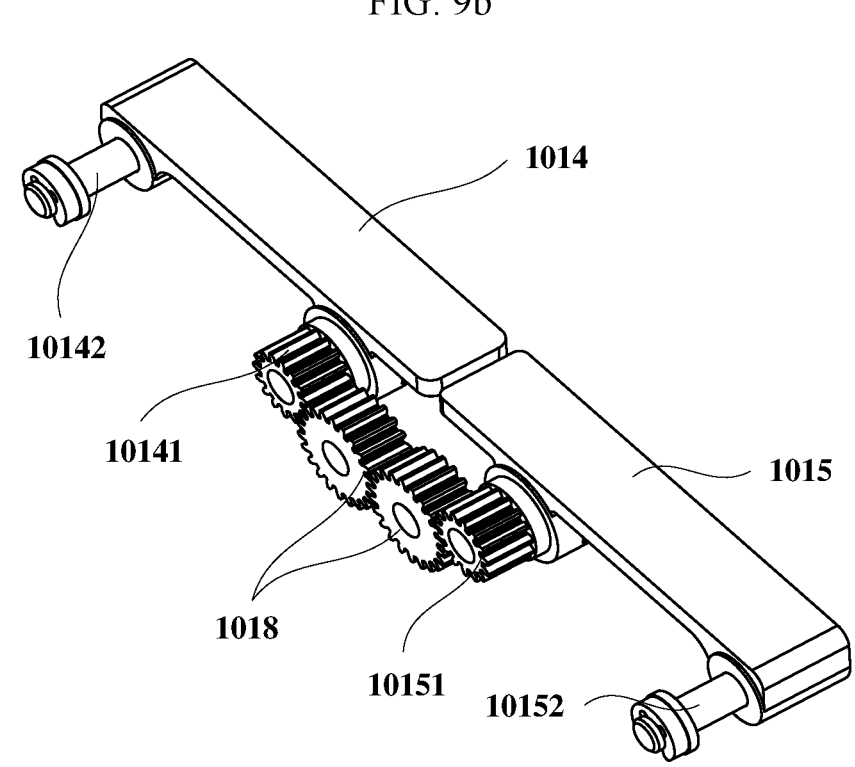
FIG. 10 is a schematic diagram of a transmission manner of a first gear linkage and a second gear linkage according to an embodiment of this application.

FIG. 10 is a schematic diagram of a transmission manner of a first gear linkage 1014 and a second gear linkage 1015 according to an embodiment of this application. In this embodiment of this application, driven gears 1018 may be further disposed between the first gear 10141 and the second gear 10151. There may be an even quantity of driven gears 1018, and the first gear 10141 and the second gear 10151 are connected through transmission by using the driven gears 1018. In this way, rotation stability of the first gear linkage 1014 and the second gear linkage 1015 is improved.

Figure 11:
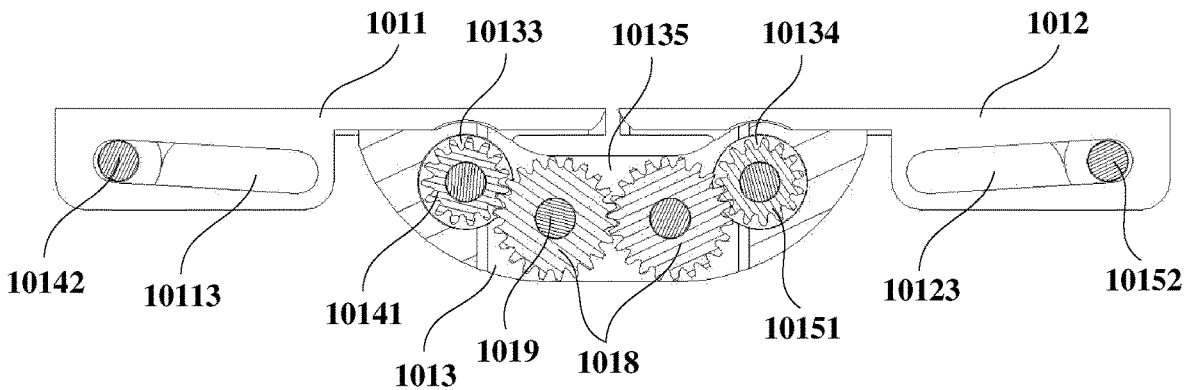
FIG. 11 is a sectional view, along B-B, of the main shaft module shown in FIG. 6.

FIG. 11 is a sectional view, along B-B, of the main shaft module 101 shown in FIG. 6. In this embodiment of this application, in a process in which the first support plate 1011 rotates relative to the base 1013, the first gear linkage 1014 may be driven to rotate relative to the base 1013. The first gear 10141 rotates with the first gear linkage 1014, drives the driven gear 1018 to rotate, and transfers a rotation force to the second gear 10151, so that the second gear linkage 1015 rotates relative to the base 1013 in a direction opposite to the first gear linkage 1014. The second gear linkage 1015 rotates to drive the second support plate 1012 to rotate relative to the base 1013, and a rotation direction of the second support plate 1012 is opposite to a rotation direction of the first support plate 1011, so that the first support plate 1011 and the second support plate 1012 rotate synchronously.

With reference to FIG. 8 and FIG. 11, in this application, the base 1013 is further provided with a gearbox 10135, and the driven gears 1018 may be mounted in the gearbox 10135. It may be understood that the first mounting hole 10133 and the second mounting hole 10134 are in communication with the gearbox 10135, to implement transmission connections between the first gear 10141, the second gear 10151, and the driven gears 1018. The gearbox 10135 is disposed, and the driven gears 1018 are mounted in the gearbox 10135, to facilitate storage of lubricant and implement lubrication between each adjacent driven gear 1018, lubrication of contact faces between the driven gears 1018 and the first gear 10141, and lubrication of contact faces between the driven gears 1018 and the second gear 10151. In this way, a risk of wear of each driven gear 1018, the first gear 10141, and the second gear 10151 is reduced, and reliability of a structure of the main shaft module 101 is improved.

In addition, in this application, with reference to FIG. 7 and FIG. 11 together, the main shaft module 101 may further include an intermediate gear shaft 1019, each driven gear 1018 may be sleeved on one intermediate gear shaft 1019, and the driven gears 1018 may be rotatably connected to the intermediate gear shaft 1019. With reference to FIG. 7 and FIG. 8, in this application, the base 1013 is further provided with a mounting groove 10136. The mounting groove 10136 may be located between the first sliding groove 10131 (the second sliding groove 10132) and the first mounting hole 10133 (the second mounting hole 10134). The first gear shaft 1016, the second gear shaft 1017, and the intermediate gear shaft 1019 may be mounted in the mounting groove 10136, so that the structure of the main shaft module 101 is relatively compact.

Still with reference to FIG. 7, the main shaft module 101 may further include a conjoined clasp 1020, and end portions that are of the first gear shaft 1016, the second gear shaft 1017, and the intermediate gear shaft 1019 and that are away from the first gear linkage 1014 and the second gear linkage 1015 may be connected by using the conjoined clasp 1020. The first gear shaft 1016, the second gear shaft 1017, and the intermediate gear shaft 1019 may be connected to the conjoined clasp 1020 in a threaded manner. That is, threaded holes are disposed at positions corresponding to the first gear shaft 1016, the second gear shaft 1017, and the intermediate gear shaft 1019 on the conjoined clasp 1020. External threads are disposed at end portions of the first gear shaft 1016, the second gear shaft 1017, and the intermediate gear shaft 1019. Therefore, it is convenient for the first gear shaft 1016, the second gear shaft 1017, and the intermediate gear shaft 1019 to be connected to the conjoined clasp 1020. With reference to both FIG. 6 and FIG. 7, in this application, the conjoined clasp 1020 may also be mounted in the mounting groove 10136, and the conjoined clasp 1020 may abut against a groove wall that is of the mounting groove 10136 and that is away from the first mounting hole 10133 (the second mounting hole 10134). In addition, in a possible embodiment of this application, to improve reliability of a connection between the conjoined clasp 1020 and the base 1013, the conjoined clasp 1020 and a groove wall of the mounting groove 10136 may be fastened in a manner of adhesion, fastener locking, or the like.

A process of unfolding or closing the electronic device using the rotating shaft mechanism 1 provided in this application is usually implemented by applying a rotation force to the first housing 2 and/or the second housing 3. To enable a user to have a relatively obvious feeling of an unfolding or closing process of the electronic device in a process in which the first housing 2 and the second housing 3 rotate relative to the base 1013. The main shaft module 101 provided in this application may further generate a damping force. During specific implementation, still with reference to FIG. 7, the first gear linkage 1014 may further be provided with a first cam structure 10143, and the first cam structure 10143 and the first gear 10141 are coaxially disposed. In addition, the first cam structure 10143 is disposed outside the base 1013. Similarly, the second gear linkage 1015 may further be provided with a second cam structure 10153. The second cam structure 10153 and the second gear 10151 are coaxially disposed, and the second cam structure 10153 is disposed outside the base 1013. In this application, the first cam structure 10143 and the first gear 10141 may be an integrated structure, and the second cam structure 10153 and the second gear 10151 may be an integrated structure. This improves structural reliability of the first gear linkage 1014 and the second gear linkage 1015.

In addition, the main shaft module 101 may further include a conjoined cam 1021, and the conjoined cam 1021 may include a third cam structure 10211 and a fourth cam structure 10212. The third cam structure 10211 may be disposed opposite to the first cam structure 10143, and the third cam structure 10211 may be sleeved on the first gear shaft 1016. In this case, the first gear shaft 1016 may run through the first gear 10141, the first cam structure 10143, and the third cam structure 10211 at the same time. The fourth cam structure 10212 may be disposed opposite to the second cam structure 10153, and the fourth cam structure 10212 may be sleeved on the second gear shaft 1017. In this case, the second gear shaft 1017 may run through the second gear 10151, the second cam structure 10153, and the fourth cam structure 10212 at the same time. It should be noted that, in this application, the cam structure includes a plurality of convex parts and recessed parts. When a convex part of one of the two cam structures that are disposed oppositely is in a recessed part of the other cam structure, the two cam structures are engaged, to prevent relative rotation between the two cam structures, thereby forming a damping force. When the convex part of one of the two cam structures that are disposed oppositely contacts a convex part of the other cam structure, the two cam structures abut against each other.

It can be learned that, in a process of relative rotation, the two cam structures that are disposed oppositely rotate to a set rotation position, so that when the two cam structures are engaged, a corresponding damping force may be formed. In this way, a relatively obvious feeling may be provided for the user in a process of rotating the electronic device, and an incorrect opening and closing of the electronic device may be avoided, to improve user experience. In addition, a spacing between the convex part and the recessed part of the cam structure is properly designed, so that when the electronic device is closed or unfolded to a specific angle, the electronic device can maintain a corresponding rotation position without an external force; or when the electronic device is unfolded to a relatively large angle (for example, greater than or equal to 150°), the electronic device can continue to be unfolded to a flat state without an external force; or when the electronic device is closed to a relatively small angle (for example, less than or equal to 30°), the electronic device can continue to move in a closing direction without an external force until it is completely closed. In this way, personalized use requirements of the user can be met.

Figure 12:
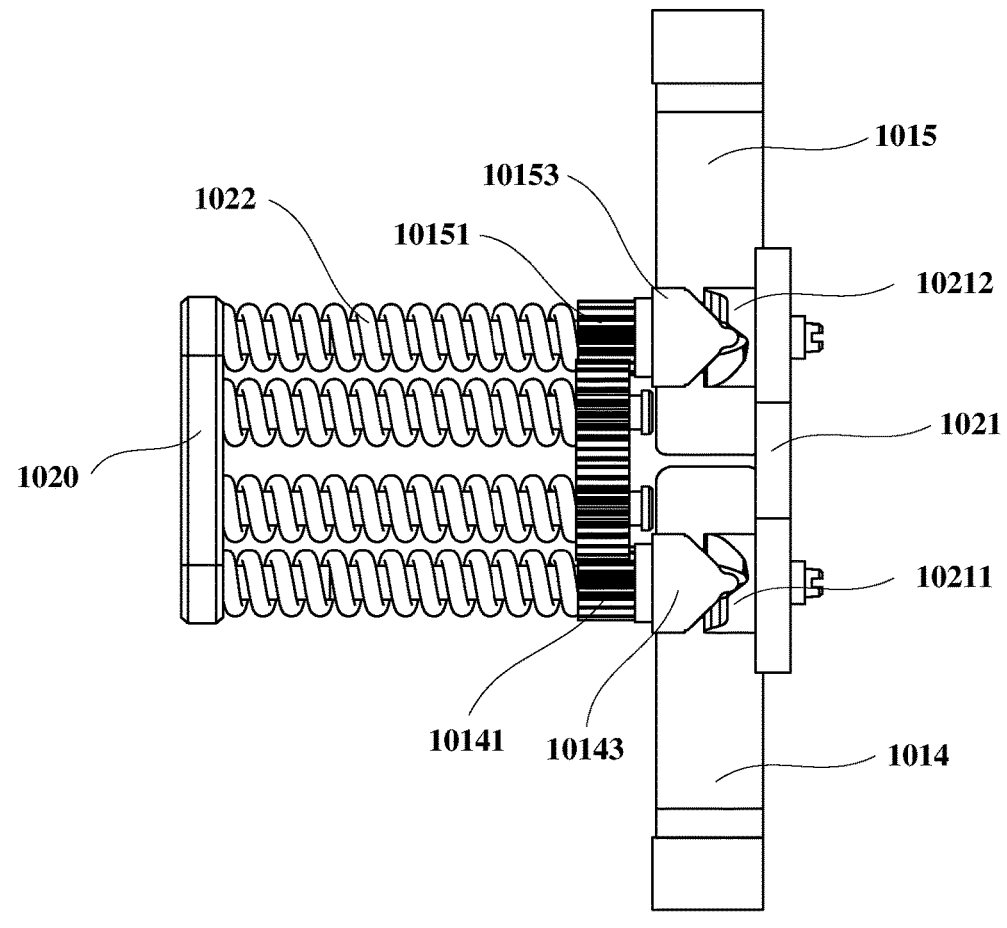
FIG. 12 is a schematic diagram of fitting between a first cam structure, a second cam structure, and a conjoined cam according to an embodiment of this application.

FIG. 12 shows fitting relationships between a first cam structure 10143, a second cam structure 10153, and a conjoined cam 1021 according to an embodiment of this application. In this application, the main shaft module 101 may further include an elastic mechanical part 1022, and the elastic mechanical part 1022 may be configured to press the first cam structure 10143 and the second cam structure 10153 against the conjoined cam 1021. During specific implementation, the elastic mechanical part 1022 may be located between the conjoined clasp 1020 and the first gear 10141 and the second gear 10151. The elastic mechanical part 1022 elastically abuts against the conjoined clasp 1020, the first gear 10141, and the second gear 10151 separately, so that the elastic mechanical part 1022 may accumulate elastic pressing forces in directions from the conjoined clasp 1020 to the first gear 10141 and the second gear 10151, to press the first cam structure 10143 and the second cam structure 10153 against the conjoined cam 1021.

In this application, a specific arrangement form of the elastic mechanical part 1022 is not limited. For example, the elastic mechanical part 1022 may be a spring, there may be a plurality of elastic mechanical parts 1022, at least one elastic mechanical part 1022 may be sleeved on the first gear shaft 1016, and at least one elastic mechanical part 1022 may be sleeved on the second gear shaft 1017. In some embodiments of this application, the elastic mechanical part 1022 may also be sleeved on the intermediate gear shaft 1019, to provide sufficient pressing force between the first cam structure 10143, the second cam structure 10153, and the conjoined cam 1021.

Still with reference to FIG. 12, in this application, to prevent the conjoined cam 1021 from falling off from the first gear shaft 1016 and the second gear shaft 1017, a fastener such as a nut may be further disposed on a side that is of the conjoined cam 1021 and that is away from the base 1013. The fastener may be disposed on the first gear shaft 1016 and the second gear shaft 1017, and is locked with the first gear shaft 1016 and the second gear shaft 1017, therefore, the conjoined cam 1021 is limited to the first gear shaft 1016 and the second gear shaft 1017.

It can be learned from the description of the foregoing embodiments that the first gear shaft 1016, the second gear shaft 1017, and the intermediate gear shaft 1019 may all be connected to the conjoined clasp 1020 in a threaded manner. Based on this, in this application, tightening degrees between the first gear shaft 1016 and the conjoined clasp 1020, between the second gear shaft 1017 and the conjoined clasp 1020, and between the intermediate gear shaft 1019 and the conjoined clasp 1020 are adjusted, so that a deformation of the elastic mechanical part 1022 can be adjusted. In this way, a pressing force between the first cam structure 10143, the second cam structure 10153, and the conjoined cam 1021 is adjusted and an objective of adjusting a damping force in a rotation process of the main shaft module 101 is achieved.

The rotating shaft mechanism 1 provided in this application is used, a module configured to implement synchronous rotation and a module providing a damping force in the main shaft module 101 of the rotating shaft mechanism 1 may be integrated into one, so that a structure of the main shaft module 101 can be effectively simplified, and the structure of the main shaft module 101 can be relatively compact. Therefore, space occupied by the main shaft module 101 in the rotating shaft mechanism 1 is reduced, so that more functional modules are disposed in the rotating shaft mechanism 1, and a diversified functional design of the electronic device that uses the rotating shaft mechanism 1 is implemented.

Figure 13:
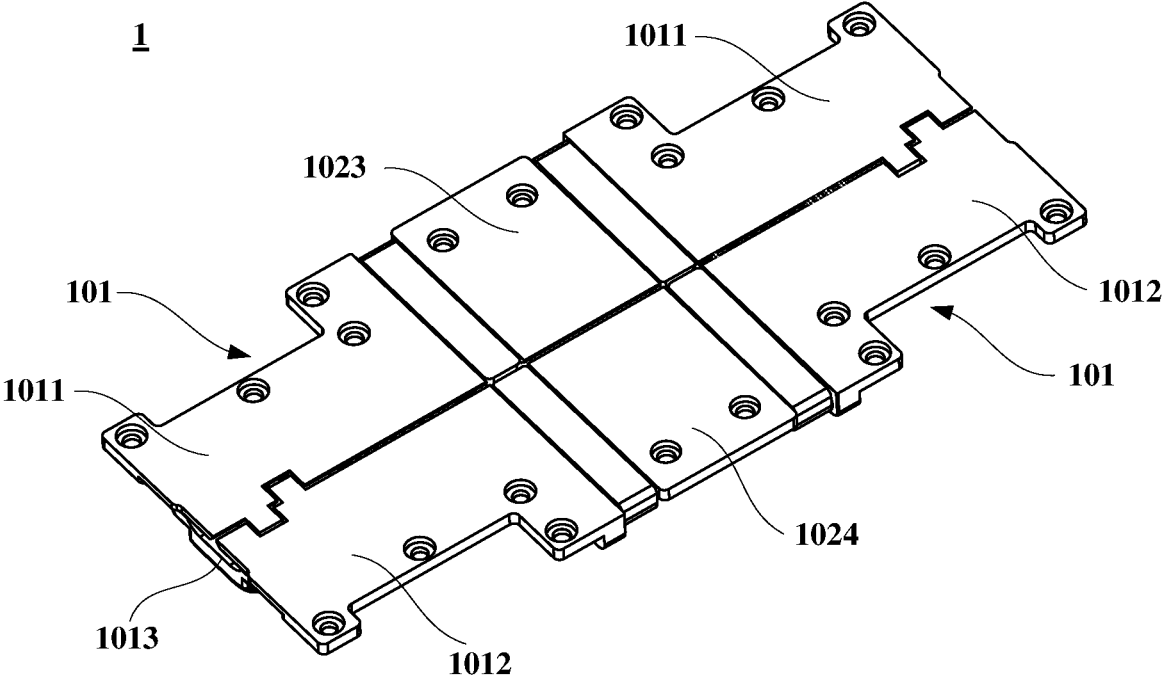
FIG. 13 is a schematic diagram of a structure of a rotating shaft mechanism according to another embodiment of this application.

In this application, when the rotating shaft mechanism 1 has a plurality of main shaft modules 101, the plurality of main shaft modules 101 may be disposed at intervals. A gap between two adjacent main shaft modules 101 is reduced, so that the rotating shaft mechanism 1 can form a relatively complete support face. FIG. 13 is a schematic diagram of a structure of a rotating shaft mechanism 1 according to an embodiment of this application. The rotating shaft mechanism 1 provided in this application may further include a cover plate. The cover plate may be disposed between two adjacent main shaft modules 101, and the cover plate includes a first sub-cover plate 1023 and a second sub-cover plate 1024. The first sub-cover plate 1023 is rotatably connected to the base 1013, and the first sub-cover plate 1023 is fastened to the first support plate 1011, to form a continuous and flat support face between the first sub-cover plate 1023 and the first support plate 1011. Similarly, the second sub-cover plate 1024 is rotatably connected to the base 1013, and the second sub-cover plate 1024 is fastened to the second support plate 1012, to form a continuous and flat support face between the second sub-cover plate 1024 and the second support plate 1012. In this way, in a process in which the first support plate 1011 rotates relative to the base 1013, the first sub-cover plate 1023 may be driven to rotate synchronously, and in a process in which the second support plate 1012 rotates relative to the base 1013, the second sub-cover plate 1024 may be driven to rotate synchronously.

In addition, it may be understood that, devices such as a circuit board or a sensor may be disposed in the two housings of the electronic device, and electrical connection between the devices in the two housings may be implemented through cables passing through the rotating shaft mechanism 1. In this embodiment of this application, the cables used to connect the devices of the two housings may pass through the rotating shaft mechanism 1 through a region covered by the cover plate, so that interference between the cables and the main shaft module 101 can be avoided, and the cables may be further hidden in the region covered by the cover plate, to improve appearance aesthetics of the rotating shaft mechanism 1.

When the rotating shaft mechanism 1 provided in this application is applied to the electronic device, still refer to FIG. 4. In addition to the foregoing structure, the rotating shaft mechanism 1 may further include a decorative cover 1025. The decorative cover 1025 has an accommodation groove 10251. In this application, the base 1013 may be used as a support component of the rotating shaft mechanism 1, therefore, the base 1013 may be accommodated in the accommodation groove 10251, and the base 1013 is fastened to the accommodation groove 10251. A connection manner may be but is not limited to a fastening connection by using a screw, a bolt, or the like. In addition, with reference to FIG. 1, when the electronic device is in a closed state, a surface of the decorative cover 1025 may be used as an outer face of the rotating shaft mechanism 1, to help improve appearance aesthetics of the electronic device.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to a protection scope of the claims.

What is claimed is:

1. A rotating shaft mechanism, comprising a main shaft module, wherein the main shaft module comprises a base, a first support plate, a second support plate, a first gear linkage, a second gear linkage, an elastic mechanical part, and a conjoined cam, wherein the first support plate and the second support plate are located on two opposite sides of the base, the first support plate and the second support plate are rotatably connected to the base, the first support plate is provided with a first track groove, and the second support plate is provided with a second track groove;

the first gear linkage and the second gear linkage are rotatably connected to an end portion of the base, wherein one end that is of the first gear linkage and that faces the second gear linkage is provided with a first gear and a first cam structure that are coaxially disposed, and one end that is of the first gear linkage and that is away from the second gear linkage is provided with a first guiding part; and one end that is of the second gear linkage and that faces the first gear linkage is provided with a second gear and a second cam structure that are coaxially disposed, and one end that is of the second gear linkage and that is away from the first gear linkage is provided with a second guiding part;

the first gear and the second gear are connected through transmission; the first guiding part is inserted into the first track groove and is slidable along the first track groove; and the second guiding part is inserted into the second track groove and is slidable along the second track groove;

the conjoined cam is provided with a third cam structure and a fourth cam structure, the third cam structure is disposed opposite to the first cam structure, and the fourth cam structure is disposed opposite to the second cam structure; and the elastic mechanical part is located on a side that is of the first cam structure and the second cam structure and that is away from the conjoined cam, and the elastic mechanical part presses the first cam structure and the second cam structure against the conjoined cam.

2. The rotating shaft mechanism according to claim 1, wherein the main shaft module further comprises a first gear shaft and a second gear shaft, the first gear shaft runs through the first gear, the first cam structure, and the third cam structure, and the first gear linkage is rotatably connected to the first gear shaft; and the second gear shaft runs through the second gear, the second cam structure, and the fourth cam structure, and the second gear linkage is rotatably connected to the second gear shaft.

3. The rotating shaft mechanism according to claim 2, wherein the main shaft module further comprises a conjoined clasp, an end portion that is of the first gear shaft and that is away from the first gear linkage is connected to the conjoined clasp in a threaded manner, and an end portion that is of the second gear shaft and that is away from the second gear linkage is connected to the conjoined clasp in a threaded manner; and the elastic mechanical part is located between the conjoined clasp and the first gear and the second gear, and the elastic mechanical part elastically abuts against the conjoined clasp, the first gear, and the second gear separately.

4. The rotating shaft mechanism according to claim 3, wherein there are a plurality of elastic mechanical parts, at least one elastic mechanical part is sleeved on the first gear shaft, and at least one elastic mechanical part is sleeved on the second gear shaft.

5. The rotating shaft mechanism according to claim 3, wherein the base is further provided with an accommodation groove, the conjoined clasp, the elastic mechanical part, the first gear shaft, and the second gear shaft are accommodated in the accommodation groove, and the conjoined clasp abuts against a groove wall of the accommodation groove.

6. The rotating shaft mechanism according to claim 1, wherein the base is provided with a first sliding groove and a second sliding groove, a side that is of the first support plate and that faces the base is provided with a first sliding arm, and a side that is of the second support plate and that faces the base is provided with a second sliding arm; and the first sliding arm is accommodated in the first sliding groove, and the first sliding arm is slidable along the first sliding groove in a direction close to or away from the second support plate; and the second sliding arm is accommodated in the second sliding groove, and the second sliding arm is slidable along the second sliding groove in a direction close to or away from the first support plate.

7. The rotating shaft mechanism according to claim 6, wherein the first sliding groove and the second sliding groove are disposed in a staggered manner in a direction from the first support plate to the second support plate.

8. The rotating shaft mechanism according to claim 1, wherein the main shaft module further comprises driven gears, there are an even quantity of driven gears, the driven gears are located between the first gear and the second gear, and the first gear and the second gear are connected through transmission by using the driven gears.

9. The rotating shaft mechanism according to claim 8, wherein the main shaft module further comprises an intermediate gear shaft, the driven gears are sleeved on the intermediate gear shaft, and the driven gears are rotatably connected to the intermediate gear shaft.

10. The rotating shaft mechanism according to claim 8, wherein the base is further provided with a gearbox, and the driven gears are mounted in the gearbox.

11. The rotating shaft mechanism according to claim 10, wherein the base is provided with a first mounting hole and a second mounting hole, and opening directions of the first mounting hole and the second mounting hole are the same as an extension direction of the rotating shaft mechanism; the first gear is mounted in the first mounting hole, the second gear is mounted in the second mounting hole, and the first mounting hole and the second mounting hole are in communication with the gearbox.

12. The rotating shaft mechanism according to claim 1, wherein the rotating shaft mechanism comprises a plurality of main shaft modules, and the plurality of main shaft modules are disposed at intervals; and the rotating shaft mechanism further comprises a cover plate, wherein the cover plate is located between two adjacent main shaft modules; the cover plate comprises a first sub-cover plate and a second sub-cover plate, the first sub-cover plate and the second sub-cover plate are rotatably connected to the base, the first sub-cover plate is fastened to the first support plate, and the second sub-cover plate is fastened to the second support plate.

13. An electronic device, comprising a first housing, a second housing, a flexible display, and a rotating shaft mechanism, wherein the first housing and the second housing are respectively disposed on two opposite sides of the rotating shaft mechanism, the first support plate is fastened to the first housing, and the second support plate is fastened to the second housing;

the flexible display continuously covers the first housing, the second housing, and the rotating shaft mechanism, and the flexible display is fastened to the first housing and the second housing; and wherein the rotating shaft mechanism comprises a main shaft module, wherein the main shaft module comprises a base, a first support plate, a second support plate, a first gear linkage, a second gear linkage, an elastic mechanical part, and a conjoined cam, wherein the first support plate and the second support plate are located on two opposite sides of the base, the first support plate and the second support plate are rotatably connected to the base, the first support plate is provided with a first track groove, and the second support plate is provided with a second track groove;

the first gear linkage and the second gear linkage are rotatably connected to an end portion of the base, wherein one end that is of the first gear linkage and that faces the second gear linkage is provided with a first gear and a first cam structure that are coaxially disposed, and one end that is of the first gear linkage and that is away from the second gear linkage is provided with a first guiding part; and one end that is of the second gear linkage and that faces the first gear linkage is provided with a second gear and a second cam structure that are coaxially disposed, and one end that is of the second gear linkage and that is away from the first gear linkage is provided with a second guiding part;

the first gear and the second gear are connected through transmission; the first guiding part is inserted into the first track groove and is slidable along the first track groove; and the second guiding part is inserted into the second track groove and is slidable along the second track groove;

the conjoined cam is provided with a third cam structure and a fourth cam structure, the third cam structure is disposed opposite to the first cam structure, and the fourth cam structure is disposed opposite to the second cam structure; and the elastic mechanical part is located on a side that is of the first cam structure and the second cam structure and that is away from the conjoined cam, and the elastic mechanical part presses the first cam structure and the second cam structure against the conjoined cam.

14. The electronic device according to claim 13, wherein the main shaft module further comprises a first gear shaft and a second gear shaft, the first gear shaft runs through the first gear, the first cam structure, and the third cam structure, and the first gear linkage is rotatably connected to the first gear shaft; and the second gear shaft runs through the second gear, the second cam structure, and the fourth cam structure, and the second gear linkage is rotatably connected to the second gear shaft.

15. The electronic device according to claim 14, wherein the main shaft module further comprises a conjoined clasp, an end portion that is of the first gear shaft and that is away from the first gear linkage is connected to the conjoined clasp in a threaded manner, and an end portion that is of the second gear shaft and that is away from the second gear linkage is connected to the conjoined clasp in a threaded manner; and the elastic mechanical part is located between the conjoined clasp and the first gear and the second gear, and the elastic mechanical part elastically abuts against the conjoined clasp, the first gear, and the second gear separately.

16. The electronic device according to claim 15, wherein there are a plurality of elastic mechanical parts, at least one elastic mechanical part is sleeved on the first gear shaft, and at least one elastic mechanical part is sleeved on the second gear shaft.

17. The electronic device according to claim 15, wherein the base is further provided with an accommodation groove, the conjoined clasp, the elastic mechanical part, the first gear shaft, and the second gear shaft are accommodated in the accommodation groove, and the conjoined clasp abuts against a groove wall of the accommodation groove.

18. The electronic device according to claim 13, wherein the base is provided with a first sliding groove and a second sliding groove, a side that is of the first support plate and that faces the base is provided with a first sliding arm, and a side that is of the second support plate and that faces the base is provided with a second sliding arm; and the first sliding arm is accommodated in the first sliding groove, and the first sliding arm is slidable along the first sliding groove in a direction close to or away from the second support plate; and the second sliding arm is accommodated in the second sliding groove, and the second sliding arm is slidable along the second sliding groove in a direction close to or away from the first support plate.

19. The electronic device according to claim 18, wherein the first sliding groove and the second sliding groove are disposed in a staggered manner in a direction from the first support plate to the second support plate.

20. The electronic device according to claim 13, wherein the main shaft module further comprises driven gears, there are an even quantity of driven gears, the driven gears are located between the first gear and the second gear, and the first gear and the second gear are connected through transmission by using the driven gears.

* * * * *